(12) United States Patent
Esarey et al.

(10) Patent No.: US 12,612,310 B2
(45) Date of Patent: Apr. 28, 2026

(54) BLENDED GRAPHENE DISPERSIONS

(71) Applicant: PPG Industries Ohio, Inc., Cleveland, OH (US)

(72) Inventors: Samuel Logan Esarey, Allison Park, PA (US); John Leonard Dimeglio, Pittsburgh, PA (US); Richard Robert Mazzocco, Jr., Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 103 days.

(21) Appl. No.: 18/554,825

(22) PCT Filed: Feb. 14, 2022

(86) PCT No.: PCT/US2022/016292
§ 371 (c)(1),
(2) Date: Oct. 11, 2023

(87) PCT Pub. No.: WO2022/220915
PCT Pub. Date: Oct. 20, 2022

(65) Prior Publication Data
US 2024/0132358 A1 Apr. 25, 2024

Related U.S. Application Data

(60) Provisional application No. 63/174,799, filed on Apr. 14, 2021.

(51) Int. Cl.
*H01B 1/24* (2006.01)
*C01B 32/19* (2017.01)
(Continued)

(52) U.S. Cl.
CPC ............ *C01B 32/194* (2017.08); *C01B 32/19* (2017.08); *C09D 5/24* (2013.01); *H01B 1/24* (2013.01);
(Continued)

(58) Field of Classification Search
CPC .... H01B 1/00; H01B 1/24; C09D 5/24; C01B 32/182
See application file for complete search history.

(56) References Cited

U.S. PATENT DOCUMENTS 9,475,946 B2 * 10/2016 Decker .................... C09D 5/24
9,938,416 B2 * 4/2018 Vanier ..................... C09D 7/61
(Continued)

FOREIGN PATENT DOCUMENTS

CN 110060818 B 11/2020
KR 10-2015-0064126 A 6/2015
(Continued)

OTHER PUBLICATIONS

Shahil et al "Graphene-Multilayer Graphene Nanocomposites as Highly Efficient Thermal Interface Materials", dx.doi.org/10.1021/nl203906r I Nano Lett. 2012, 12, 861-867.*
(Continued)

*Primary Examiner* — Mark Kopec

(57) ABSTRACT

A dispersion of graphenic carbon nanoparticles is disclosed comprising a solvent, greater than one weight percent graphenic carbon nanoparticles based upon a total weight of the dispersion comprising thermally produced graphenic carbon nanoparticles and base graphene particles, and a polymeric resin dispersant. The weight ratio of the graphenic carbon nanoparticles to the dispersant may be greater than 5:1, and the dispersion may have an instability index of less than 0.7. A method is also disclosed for dispersing graphenic carbon particles in a solvent. A polymeric resin dispersant is mixed into the solvent, and graphenic carbon nanoparticles comprising thermally produced graphenic carbon nanoparticles and base graphenic particles are dispersed into the solvent.

19 Claims, 7 Drawing Sheets

(51) Int. Cl.
    *C01B 32/194*     (2017.01)
    *C09D 5/24*      (2006.01)

(52) U.S. Cl.
    CPC ...... *C01B 2204/22* (2013.01); *C01B 2204/28*
        (2013.01); *C01B 2204/32* (2013.01); *C01P*
        *2002/82* (2013.01); *C01P 2004/03* (2013.01);
        *C01P 2004/54* (2013.01); *C01P 2006/22*
        (2013.01)

(56) References Cited

U.S. PATENT DOCUMENTS

| | | | |
|---|---|---|---|
| 12,084,349 B2 * | 9/2024 | Ding | C10M 161/00 |
| 2015/0159024 A1 | 6/2015 | Decker et al. | |
| 2015/0240088 A1 | 8/2015 | Asay et al. | |
| 2018/0142114 A1 | 5/2018 | Duan et al. | |

FOREIGN PATENT DOCUMENTS

| | | | |
|---|---|---|---|
| KR | 10-2017-0033882 A | 3/2017 | |
| KR | 10-2018-0061087 A | 6/2018 | |
| WO | 2014/070346 A1 | 5/2014 | |
| WO | WO-2016014641 A1 * | 1/2016 | C01B 32/194 |
| WO | 2020/172330 A1 | 8/2020 | |

OTHER PUBLICATIONS

International Search Report and Written Opinion received for PCT Application Serial No. PCT/US2022/016292 dated Jun. 10, 2022, 15 pages.

\* cited by examiner

| HV | mag 奥 | WD | HFW | det | ├──────100 μm──────┤ |
|---|---|---|---|---|---|
| 10.00 kV | 500 X | 10.0 mm | 254 μm | ETD | |

| HV | mag 兕 | WD | HFW | det | |
|---|---|---|---|---|---|
| 10.00 kV | 500 X | 9.9 mm | 254 μm | ETD | ⊢————100 μm————⊣ |

| HV | mag 奥 | WD | HFW | det | ⊢————100 μm————⊣ |
|---|---|---|---|---|---|
| 10.00 kV | 500 X | 9.9 mm | 254 μm | ETD | |

BLENDED GRAPHENE DISPERSIONS

CROSS-REFERENCE TO RELATED APPLICATION

This application claims the benefit of U.S. Provisional Patent Application Ser. No. 63/174,799, filed Apr. 14, 2021, which is incorporated herein by reference.

GOVERNMENT CONTRACT

This invention was made with Government support under Government Contract No. NCMS FY2017 awarded by the United States Army Ground Vehicle Systems Center. The United States Government has certain rights in this invention.

FIELD OF THE INVENTION

The present invention relates to dispersions of graphene comprising thermally produced graphenic carbon nanoparticles and at least one other type of graphene and/or graphite particles.

BACKGROUND INFORMATION

Graphene dispersions typically do not have good stability, even at low solids loadings such as one percent, and commonly need re-dispersed within a few hours. This makes incorporating the graphenic sources into coatings or other materials for their desired conductivity or mechanical properties difficult to achieve.

SUMMARY OF THE INVENTION

Disclosed herein is a dispersion of graphenic carbon nanoparticles comprising a solvent, greater than 1 weight percent graphenic carbon nanoparticles based upon a total weight of the dispersion comprising thermally produced graphenic carbon nanoparticles and base graphene particles, and a polymeric resin dispersant. The weight ratio of the graphenic carbon nanoparticles to the dispersant is greater than 5:1, and the dispersion has an instability index of less than 0.7.

Also disclosed herein is a method of dispersing graphenic carbon particles in a solvent comprising mixing a polymeric resin dispersant into the solvent, and dispersing into the solvent greater than 1 weight percent graphenic carbon nanoparticles based upon a total weight of the dispersion comprising thermally produced graphenic carbon nanoparticles TG and base graphenic particles BG. The weight ratio of the graphenic carbon nanoparticles TG and BG to the dispersant is greater than 5:1, and the dispersion has an instability index of less than 0.7.

DETAILED DESCRIPTION OF THE INVENTION

Figure 1:
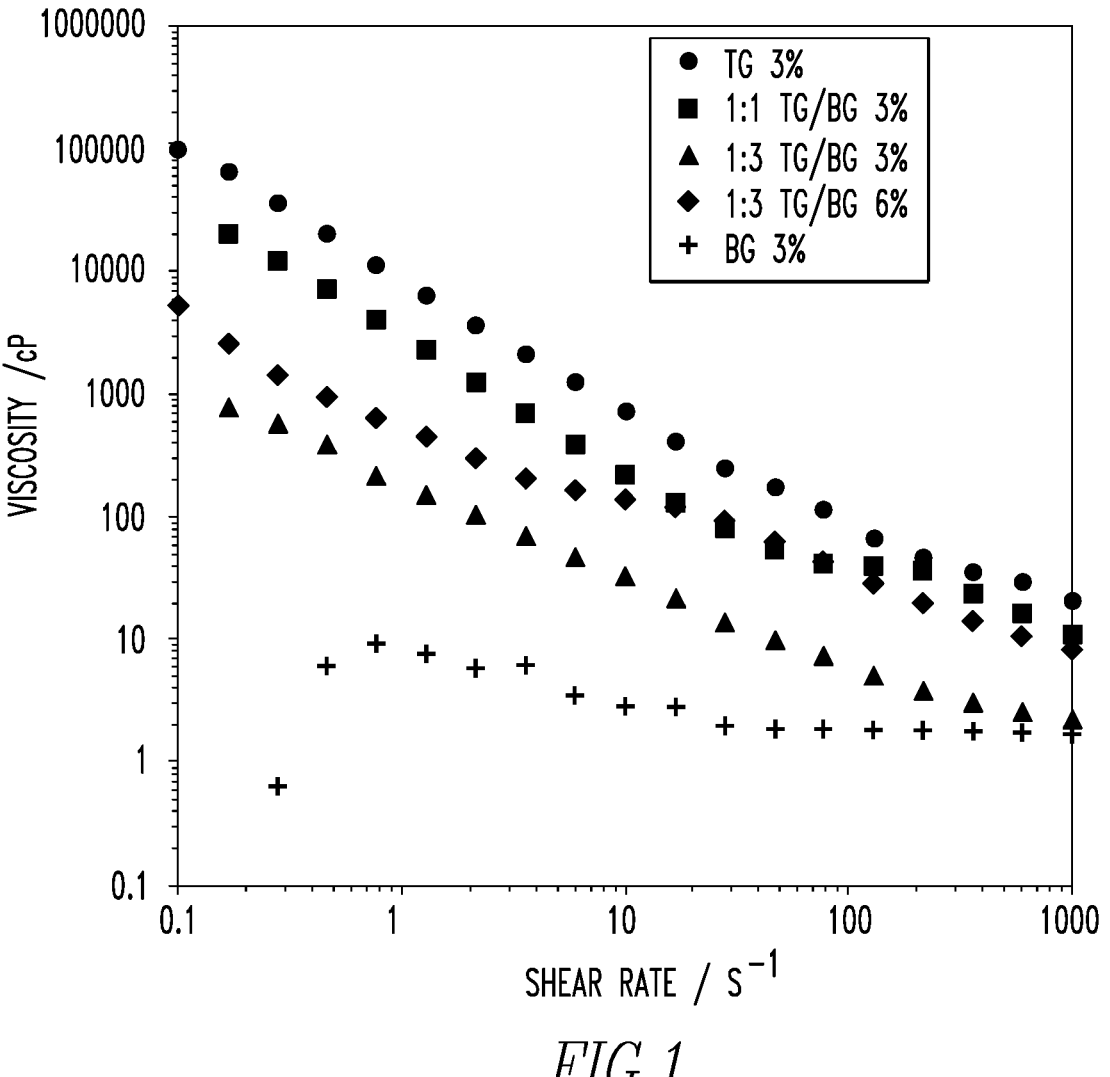
FIG. 1 is a graph of viscosity vs. shear rate for various aqueous graphene dispersions.

The present invention provides dispersions of thermally produced graphenic carbon nanoparticles and other types of graphenic or graphitic particles. Thermally produced graphenic carbon nanoparticles are used to achieve high stability in aqueous and solvent dispersions, for example, achieving over 2 or 3 weight percent loadings with small amounts of dispersant. The high dispersion stability of thermally produced graphenic carbon nanoparticles coupled with interactions with other graphene sources in solution can stabilize the other forms of graphene, allowing them to be better integrated into coatings or other materials. The synergistic effect between thermally produced graphenic carbon nanoparticles and other graphenic and/or graphitic sources can help enable the use of graphenic/graphitic carbon as highly conductive, mechanically strong nanoparticles to improve properties such as electrical conductivity, corrosion protection, tensile strength, hydrogen impermeability reducing hydrogen embrittlement, and other properties.

Introduction of thermally produced graphenic carbon nanoparticles to dispersions containing other graphene or graphite sources can improve slurry rheology, stability and connectivity, yielding better results using graphene sources intended to provide theoretical benefits such as conductivity, mechanical strength, corrosion protection, etc. Blended graphene dispersions using combinations of thermally produced graphenic carbon nanoparticles and other graphene sources may improve desired performance metrics in a synergistic way between the blended graphene sources compared to coatings where thermally produced graphenic carbon nanoparticles is not used, or is used on its own.

The present invention provides dispersions of two or more types of graphenic carbon nanoparticles that are stable during storage and use. At least one of the types of nanoparticles comprises thermally produced graphenic carbon nanoparticles, as more fully described below. The stable dispersions may be used in many different applications including conductive inks, battery anode and/or cathode coatings, supercapacitors, EMI shielding, RFI shielding, thermally conductive coatings, electrically conductive coatings, corrosion protective coatings, lubricants, coolants, composites, additive manufactured articles and the like. Conductive inks may include silver inks, medical electrode inks, silver hybrids, carbon inks, dielectric inks, zinc electrode battery inks, manganese battery inks, thermoset carbon battery inks, IR-transparent security ink and low resistance UV inks. Applications of conductive ink include smartphones, tablets, interactive and electrochromic displays, biomedical sensors, printed keypads, industrial membrane switch controls, RFID tags and other products with printed circuitry.

The dispersions of the present invention may include aqueous and/or organic solvents in which selected amounts of graphenic particles are dispersed. As used herein, the term "dispersed" means that thermally produced graphenic carbon nanoparticles, in combination with at least one other type of graphene particles, are dispersed in a medium such as a solvent containing a polymeric dispersant to form a substantially uniform dispersion of the combined graphenic carbon nanoparticles throughout the medium without substantial agglomeration of the particles. As more fully described below, the uniformity of the dispersions may be measured by an "instability index". The presence of agglomerations may be determined by standard methods such as visual analysis of TEM micrograph images. Agglomerations may also be detected by standard particle size measurement techniques, as well as measurements of electrical conductivity or measurements of optical characteristics of materials containing the graphenic carbon particles such as color, haze, jetness, reflectance and transmission properties.

The present dispersions comprise thermally produced graphenic carbon particles (TG) and base graphene particles (BG). The thermally produced graphenic carbon particles TG have been found to facilitate dispersion and allow greater overall loadings of at least one additional type of base graphene or graphite particles BG, as more fully described below.

The total amount of graphenic particles TG and BG, based on weight percent of the dispersion, may be at least 1 weight percent, or at least 1.2 weight percent, or at least 1.5 weight percent, or at least 2 weight percent, or at least 3 percent, or at least 4 weight percent, or at least 5 weight percent, or at least 6 weight percent, or at least 7 weight percent, or at least 8 weight percent, or higher. For example, the total weight percentage of the graphenic carbon particles may be from 0.1 to 15 weight percent, or from 0.5 to 12 weight percent, or from 1 to 10 weight percent, or from 2 to 9 weight percent, or from 3 to 8 weight percent. In some cases, the total percentage of graphenic carbon particles may be from 2 to 9 weight percent, or from 3 to 8 weight percent, or from 3 to 6 weight percent.

The weight ratio of the thermally produced graphenic carbon particles to the base graphene particles TG:BG may be selected as desired to provide sufficient stability and overall particle loadings in the dispersions. For example, the weight ratio of TG:BG may typically be greater than 0.1:1, or greater than 0.2:1, or greater than 0.5:1 or greater than 0.8:1 or greater than 0.9:1 or greater than 1:1, or greater than 1.2:1 or greater than 1.5:1. The weight ratio TG:BG may typically be less than 100:1, or less than 50:1, or less than 20:1, or less than 10:1, or less than 5:1, or less than 3:1, or less than 2:1, or less than 1.5:1, or less than 1.2:1. The weight ratio of TG:BG may typically range from 0.1:1 to 20:1, or from 0.8:1 to 10:1, or from 0.9:1 to 5:1, or from 1:1 to 3:1, or from 1.2:1 to 2:1.

The base graphene particles BG may comprise graphenic and/or graphitic particles such as graphene produced from exfoliated graphite. Examples of commercially available exfoliated graphite graphene include XG Sciences Grades M, C, R and H such as M5, M15 and M25. Exfoliated graphite graphene is also commercially available from the Global Graphene Group/Angstron Materials, First Graphene, and NanoXplore under the designations N002-PDRAM, N002-PDEAM, N006-P, N008-N, N008-P-10, N008-P-10, N008-P-40, N002-PS, Gi-PW-B056, Pure-GRAPH, and GrapheneBlack. Other types of base graphenic particles BG include reduced graphene oxide, graphene oxide, amine-functionalized reduced graphene oxide, amine-functionalized graphene oxide, nitrogen-doped graphene, graphetized carbon black, graphene nanoribbons, single-walled carbon nanotubes, multi-walled carbon nanotubes, fullerenes, and the like.

When the base graphenic carbon particles BG are in the form of nanotubes, they may have outer diameters ranging from 0.3 to 100 nanometers, or from 0.4 to 40 nanometers, lengths ranging from 0.3 nanometers to 50 centimeters, or from 500 nanometers to 500 microns, and length:diameter aspect ratios ranging from 1:1 to 100,000,000:1, or from 10:1 to 10,000:1.

The dispersions may be made by adding both types of graphene TG and BG into water or organic solvent together, followed by mixing and optional milling. Alternatively, the different graphenes TG and BG may be added separately into water or organic solvent and mixed separately, followed by combining the mixtures together. The mixtures may optionally be milled prior to combining the mixtures, or my be milled after they are combined.

In addition to the graphenic carbon particles TG and BG in amounts as described above, the aqueous or organic solvent dispersions may include at least one dispersant, such as polymeric dispersants described more fully below. The weight percentage of the dispersant(s), based upon the total weight of the dispersion may typically be less than 10 weight percent, or less than 5 weight percent, or less than 2 weight percent, or less than 1 weight percent, or less than 0.5 weight percent. The weight percentage of the dispersant, when present, may typically be greater than 0.005 weight percent, or greater than 0.01 weight percent, or greater than 0.05 weight percent, or greater than 0.1 weight percent. The weight percentage of the dispersant may typically range from 0.01 to 10 weight percent, or from 0.05 to 5 weight percent, or from 0.1 to 1 weight percent.

The weight ratio of the total weight of combined graphenic carbon nanoparticles TG and BG to resin dispersant may typically be greater than 4:1, or greater than 5:1, or greater than 6:1, or greater than 8:1, or greater than 10:1, or greater than 12:1, such as 5:1, 6:1, 7:1, 8:1, 9:1, 10:1, 11:1, 12:1, 13:1, 14:1 or higher. For example, the weight ratio of TG and BG to resin dispersant may be up to 100:1, or up to 50:1, or up to 25:1, or up to 20:1, or up to 15:1. The weight ratio of TG and BG to resin dispersant may typically range from 5:1 to 50:1, or from 8:1 to 25:1, or from 10:1 to 20:1, or from 12:1 to 16:1.

The thermally produced graphenic carbon particles TG used in the present invention may be obtained from commercial sources. For example, from Raymor under the designation PureWave graphene. As discussed in detail below, the thermally produced graphenic carbon particles TG may be produced in accordance with the methods and apparatus described in U.S. Pat. Nos. 8,486,363, 8,486,364 and 9,221,688, which are incorporated herein by reference.

As used herein, the terms "thermally produced graphenic carbon particles" and "TG" mean carbon nanoparticles having structures comprising one or more layers of one-atom-thick planar sheets of $sp^2$-bonded carbon atoms that are densely packed in a honeycomb crystal lattice. The average number of stacked layers may be less than 100, for example, less than 50. In certain embodiments, the average number of stacked layers is 30 or less, such as 20 or less, 10 or less, or, in some cases, 5 or less. The average number of stacked layers may be greater than 2, for example, greater than 3, or greater than 4. At least a portion of the thermally produced graphenic carbon particles TG may be in the form of platelets that are substantially curved, curled, crinkled, creased or buckled. The thermally produced graphenic carbon nanoparticles may be turbostatic, i.e., adjacent stacked atom layers do not exhibit ordered AB Bernal stacking associated with conventional exfoliated graphene, but rather exhibit disordered or non-ABABAB stacking.

The thermally produced graphenic carbon nanoparticles TG may have a thickness, measured in a direction perpendicular to the carbon atom layers, of no more than 10 nanometers, no more than 5 nanometers, or, in certain embodiments, no more than 4 or 3 or 2 or 1 nanometers, such as no more than 3.6 nanometers. The graphenic carbon particles TG may be from 1 atom layer up to 3, 6, 9, 12, 20 or 30 atom layers thick, or more. The graphenic carbon particles present in the compositions of the present invention have a width and length, measured in a direction parallel to the carbon atoms layers, of at least 50 nanometers, such as more than 100 nanometers, in some cases more than 100 nanometers up to 500 nanometers, or more than 100 nanometers up to 200 nanometers. The graphenic carbon particles may be provided in the form of ultrathin flakes, platelets or sheets having relatively high aspect ratios (aspect ratio being defined as the ratio of the longest dimension of a particle to the shortest dimension of the particle) of greater than 3:1, such as greater than 10:1.

The thermally produced graphenic carbon nanoparticles TG may have relatively low oxygen content. For example, the graphenic carbon particles may, even when having a thickness of no more than 5 or no more than 2 nanometers, have an oxygen content of no more than 2 atomic weight percent, such as no more than 1.5 or 1 atomic weight percent, or no more than 0.6 atomic weight, such as about 0.5 atomic weight percent. The oxygen content of the thermally produced graphenic carbon particles TG can be determined using X-ray Photoelectron Spectroscopy, such as is described in D. R. Dreyer et al., Chem. Soc. Rev. 39, 228-240 (2010).

The thermally produced graphenic carbon nanoparticles TG may have a B.E.T. specific surface area of at least 50 square meters per gram, such as 70 to 1000 square meters per gram, or, in some cases, 200 to 1000 square meters per grams or 200 to 400 square meters per gram. As used herein, the term "B.E.T. specific surface area" refers to a specific surface area determined by nitrogen adsorption according to the ASTMD 3663-78 standard based on the Brunauer-Emmett-Teller method described in the periodical "The Journal of the American Chemical Society", 60, 309 (1938).

The thermally produced graphenic carbon nanoparticles TG may have a Raman spectroscopy 2D/G peak ratio of at least 0.7:1, or at least 0.8:1, or at least 0.9:1, or at least 0.95:1, or at least 1:1, for example, at least 1.1:1, or at least 1.2:1. As used herein, the term "2D/G peak ratio" refers to the ratio of the intensity of the 2D peak at 2692 cm$^{-1}$ to the intensity of the G peak at 1,580 cm$^{-1}$. Such 2D/G peak ratios may be present in graphenic carbon nanoparticles having an average number of stacked layers greater than 2, such as 3 or more stacked layers.

The thermally produced graphenic carbon nanoparticles TG may have a relatively low bulk density. For example, the thermally produced graphenic carbon particles TG used in certain embodiments of the present invention are characterized by having a bulk density (tap density) of less than 0.2 g/cm$^3$, such as no more than 0.1 g/cm$^3$. For the purposes of the present invention, the bulk density of the graphenic carbon particles is determined by placing 0.4 grams of the graphenic carbon particles in a glass measuring cylinder having a readable scale. The cylinder is raised approximately one-inch and tapped 100 times, by striking the base of the cylinder onto a hard surface, to allow the graphenic carbon particles to settle within the cylinder. The volume of the particles is then measured, and the bulk density is calculated by dividing 0.4 grams by the measured volume, wherein the bulk density is expressed in terms of g/cm$^3$.

The thermally produced graphenic carbon nanoparticles TG may have a compressed density and a percent densification that is less than the compressed density and percent densification of graphite powder and certain types of substantially flat graphenic carbon particles. Lower compressed density and lower percent densification are each currently believed to contribute to better dispersion and/or rheological properties than graphenic carbon particles exhibiting higher compressed density and higher percent densification. In certain embodiments, the compressed density of the graphenic carbon particles is 0.9 or less, such as less than 0.8, less than 0.7, such as from 0.6 to 0.7. In certain embodiments, the percent densification of the graphenic carbon particles is less than 40%, such as less than 30%, such as from 25 to 30%.

For purposes of the present invention, the compressed density of graphenic carbon particles is calculated from a measured thickness of a given mass of the particles after compression. Specifically, the measured thickness is determined by subjecting 0.1 grams of the graphenic carbon particles to cold press under 15,000 pound of force in a 1.3 centimeter die for 45 minutes, wherein the contact pressure is 500 MPa. The compressed density of the graphenic carbon particles is then calculated from this measured thickness according to the following equation:

$$\text{Compressed Density (g/cm}^3) = \frac{0.1 \text{ grams}}{\pi * (1.3 \text{ cm}/2)^2 * (\text{measured thickness in cm})}$$

The percent densification of the graphenic carbon particles is then determined as the ratio of the calculated compressed density of the graphenic carbon particles, as determined above, to 2.2 g/cm$^3$, which is the density of graphite.

The thermally produced graphenic carbon nanoparticles TG may have a measured bulk liquid conductivity of at least 100 microSiemens, such as at least 120 microSiemens, such as at least 140 microSiemens immediately after mixing and at later points in time, such as at 10 minutes, or 20 minutes, or 30 minutes, or 40 minutes. For the purposes of the present invention, the bulk liquid conductivity of the graphenic carbon particles is determined as follows. First, a sample comprising a 0.5% solution of graphenic carbon particles in butyl cellosolve is sonicated for 30 minutes with a bath sonicator. Immediately following sonication, the sample is placed in a standard calibrated electrolytic conductivity cell (K=1). A Fisher Scientific AB 30 conductivity meter is introduced to the sample to measure the conductivity of the sample. The conductivity is plotted over the course of about 40 minutes.

The thermally produced graphenic carbon nanoparticles TG may be substantially free of unwanted or deleterious materials. For example, the graphenic carbon particles may contain zero or only trace amounts of polycyclic aromatic hydrocarbons (PAHs), e.g., less than 2 weight percent PAH, less than 1 weight percent PAH, or zero PAH.

In accordance with embodiments of the invention, thermally-produced graphenic carbon particles TG are made from carbon-containing precursor materials that are heated to high temperatures in a thermal zone such as a plasma. The carbon-containing precursor, such as a hydrocarbon provided in gaseous or liquid form, is heated in the thermal zone to produce the graphenic carbon particles in the thermal zone or downstream therefrom. For example, thermally-produced graphenic carbon particles may be made by the systems and methods disclosed in U.S. Pat. Nos. 8,486,363, 8,486,364 and 9,221,688.

The thermally produced graphenic carbon particles TG may be made by using the apparatus and method described in U.S. Pat. No. 8,486,363 in which (i) one or more hydrocarbon precursor materials capable of forming a two-carbon fragment species (such as n-propanol, ethane, ethylene, acetylene, vinyl chloride, 1,2-dichloroethane, allyl alcohol, propionaldehyde, and/or vinyl bromide) is introduced into a thermal zone (such as a plasma), and (ii) the hydrocarbon is heated in the thermal zone to a temperature of at least 1,000° C. to form the graphenic carbon particles. The thermally produced graphenic carbon particles TG may be made by using the apparatus and method described in U.S. Pat. No. 8,486,364 in which (i) a methane precursor material (such as a material comprising at least 50 percent methane, or, in some cases, gaseous or liquid methane of at least 95 or 99 percent purity or higher) is introduced into a thermal zone (such as a plasma), and (ii) the methane precursor is heated in the thermal zone to form the graphenic carbon particles. Such methods can produce graphenic carbon particles having at least some, in some cases all, of the characteristics described above.

During production of the graphenic carbon particles by the thermal production methods described above, a carbon-containing precursor is provided as a feed material that may be contacted with an inert carrier gas. The carbon-containing precursor material may be heated in a thermal zone, for example, by a plasma system such as a DC plasma, RF plasma, microwave plasma, etc. In certain embodiments, the precursor material is heated to a temperature ranging from greater than 2,000° C. to 20,000° C. or more, such as 3,000° C. to 15,000° C. For example, the temperature of the thermal zone may range from 3,500 to 12,000° C., such as from 4,000 to 10,000° C. Although the thermal zone may be generated by a plasma system, it is to be understood that any other suitable heating system may be used to create the thermal zone, such as various types of furnaces including electrically heated tube furnaces and the like.

The gaseous stream may be contacted with one or more quench streams that are injected into the plasma chamber through at least one quench stream injection port. The quench stream may cool the gaseous stream to facilitate the formation or control the particle size or morphology of the graphenic carbon particles. In certain embodiments of the invention, after contacting the gaseous product stream with the quench streams, the ultrafine particles may be passed through a converging member. After the graphenic carbon particles exit the plasma system, they may be collected. Any suitable means may be used to separate the graphenic carbon particles from the gas flow, such as, for example, a bag filter, cyclone separator or deposition on a substrate.

Without being bound by any theory, it is currently believed that the foregoing methods of thermally manufacturing graphenic carbon nanoparticles TG are particularly suitable for producing graphenic carbon nanoparticles having relatively low thickness and relatively high aspect ratio in combination with relatively low oxygen content, as described above. Moreover, such methods are currently believed to produce a substantial amount of graphenic carbon nanoparticles having a substantially curved, curled, creased or buckled morphology (referred to herein as a "3D" morphology), as opposed to producing predominantly particles having a substantially two-dimensional (or flat) morphology. This characteristic is believed to be reflected in the previously described compressed density characteristics and is believed to be beneficial in the present invention because, it is currently believed, when a significant portion of the graphenic carbon particles have a 3D morphology, "edge to edge" and "edge-to-face" contact between graphenic carbon particles within the composition may be promoted. This is thought to be because particles having a 3D morphology are less likely to be aggregated in the composition (due to lower Van der Waals forces) than particles having a two-dimensional morphology. Moreover, it is currently believed that even in the case of "face to face" contact between the particles having a 3D morphology, since the particles may have more than one facial plane, the entire particle surface is not engaged in a single "face to face" interaction with another single particle, but instead can participate in interactions with other particles, including other "face to face" interactions, in other planes. As a result, graphenic carbon particles having a 3D morphology may provide good electrically and/or thermally conductive pathways in the dispersions and may be useful for obtaining electrical and/or thermal conductivity characteristics. In addition, the 3D morphology may provide super-lubricity in certain formulations.

The graphenic carbon nanoparticles TG and/or BG may be milled to improve their dispersibility and/or stability in the compositions. Various different types of milling techniques may be used, such as solid-state milling, ball milling, dry-ball milling, Eiger milling, LAU milling, Cowles blade milling, and the like.

In addition to graphenic carbon nanoparticles TG and BG, the dispersions may include various types of resin dispersants. The resins may improve dispersion and/or stability of the graphenic carbon nanoparticles in the dispersions. For example, the resin dispersant may include an addition polymer comprising the residue of vinyl pyrrolidone, such as, for example, polyvinyl pyrrolidone (PVP). The PVP may have a weight average molecular weight of at least 1,000 g/mol, such as at least 3,000 g/mol, such as at least 5,000 g/mol. The PVP may have a weight average molecular weight of no more than 5,000,000 g/mol, such as no more than 4,000,000 g/mol, such as no more than 3,000,000 g/mol, such as no more than 2,000,000 g/mol. The PVP may have a weight average molecular weight of from 1,000 to 5,000,000 g/mol, such as from 1,000 to 4,000,000 g/mol, such as from 1,000 to 3,000,000 g/mol, such as from 1,000 to 2,000,000 g/mol.

For example, the resin dispersant may include a combination of lauryl methacrylate (LMA) and vinyl pyrrolidone (VP) resins. LMA-VP copolymers may be synthesized using conventional free radical polymerization chemistry. In such formulations, the LMA may typically comprise from 10 to 90 weight percent, and the VP may typically comprise from 10 to 90 weight percent. For example, the LMA may range from 40 or 50 to 85 weight percent, and the VP may range from 15 to 50 or 60 weight percent. In certain embodiments, the LMA may comprise about 75 weight percent, and the VP may comprise about 25 weight percent. The resin dispersants may promote dispersion and stability in milled and non-milled graphenic carbon nanoparticle dispersions.

For example, the resin dispersant may include an addition copolymer comprising the residue of stearyl acrylate (SA) and vinyl pyrrolidone (VP). SA-VP copolymers may be synthesized using conventional free radical polymerization chemistry. In such formulations, the SA may typically comprise from 10 to 90 weight percent, and the VP may typically comprise from 10 to 90 weight percent. For example, the SA may range from 40 or 50 to 85 weight percent, and the VP may range from 15 to 50 or 60 weight percent. In certain embodiments, the SA may comprise about 75 weight percent, and the VP may comprise about 25 weight percent.

The dispersant resins enhance graphenic carbon nanoparticle dispersion stability and may expand utilization of such nanoparticles in applications such as conductive inks, battery manufacturing, thermally conductive coatings, electrically conductive coatings, EMI and RFI shielding coatings, corrosion protective coatings, lubricants, composites, 3-D printing, and the like. Advantages of the present dispersants may include extended shelf life, high graphenic carbon nanoparticle loadings and dispersions which remain stable at room temperature and elevated temperatures.

The graphenic carbon nanoparticles and resin dispersants may be added to various types of solvents to produce the dispersions of the present invention. Suitable solvents include aqueous solvents and organic solvents such as N-methyl-2-pyrrolidone (NMP), oil, benzyl alcohol, diethylene glycol monoethyl ester (DE) acetate, butyl cellosolve, triethyl phosphate, and the like.

The combined graphenic carbon nanoparticles TG and BG of the present invention may thus be dispersed in various types of aqueous and organic solvents in relatively large amounts to produce dispersions with relatively high loadings of combined graphenic carbon particles TG and BG in comparison with dispersions of conventional graphenic carbon particles BG. For example, the graphenic carbon particles TG and BG may comprise at least 1 weight percent of the total combined weight of the solvent and graphenic carbon particles. For example, the graphenic carbon particles may comprise at least 1.5 weight percent, or at least 2 weight percent, or at least 3 weight percent, or at least 6 weight percent of the dispersions. For example, in water-based solvent dispersions, the graphenic carbon particles TG and BG may be dispersed in amounts up to 8 weight percent, or up to 10 weight percent, up to 12 weight percent, or higher. In organic solvent dispersions such as NMP, the graphenic carbon particles TG and BG may be present in amounts up to 8 weight percent, or up to 10 weight percent, or up to 12 weight percent, or higher.

Instability index analysis may be used for accelerated evaluation of long-term stability, which measures dispersion sedimentation at specified centrifuging speeds and temperatures. Unless otherwise indicated in the specification or claims, the "instability index" is measured as follows: dispersion samples are loaded in a centrifuge and pulsed near IR light at 865 nm is transmitted through the samples. During centrifuging, the near IR light transmitted through the samples is measured with a dispersion analyzer sold under the designation LUMiSizer Model 611 by LuM GmbH. The measurement is made at 25° C. and 4000 rpm centrifuge speed with a relative centrifugal acceleration (RCA) of 2202 during approximately 20 to 35 minutes of centrifuging. The transmission level at the beginning of the centrifuging is compared with the transmission level at the end of the 20 minute period, and the instability index is calculated by normalizing the recorded change in transmission levels. The instability index reported is a dimensionless number between 0 and 1, with "0" meaning no changes of particle concentration and "1" meaning that a dispersion has completely phase separated. A relatively unstable dispersion will exhibit a higher increase in transmission due to significant phase separation of the graphenic carbon nanoparticles and solvent, while a relatively stable dispersion will exhibit a lower increase in transmission due to less phase separation. The instability index may be calculated using the SEP-View® software tool. A description of how the SEPView® software tool determines the instability index is provided in the article entitled "Instability Index" (T. Detloff, T. Sobisch, D. Lerche, Instability Index, Dispersion Letters Technical, T4 (2013) 1-4, Update 2014), which is incorporated herein by reference. The instability index of aqueous dispersions of graphenic carbon nanoparticles may typically be less than 0.7, for example, less than 0.6, or less than 0.5, or less than 0.4, or less than 0.3, or less than 0.1. The instability index of dispersions of graphenic carbon nanoparticles in oil solvents is typically less than 0.5, for example, less than 0.4, or less than 0.3, or less than 0.2 or less than 0.1.

The instability index may be at least 10% lower than a similar dispersion containing only base graphenic carbon particles BG, for example, at least 50% lower, or at least 100% lower, or at least 300% lower, or at least 500% lower.

Solvent mixtures containing combinations of thermally produced graphenic carbon particles TG and base graphenic particles BG may have lower viscosities in comparison with similar solvent mixtures containing only base graphenic carbon nanoparticles BG. For example, at a total loading of 1 weight percent graphenic carbon nanoparticles, the combined TB/BG particles may result in a viscosity of the solvent dispersion that is at least 10 or 20 percent less than the viscosity of a similar solvent dispersion with only the BG particles. Viscosity may be measured by standard techniques in which rheological measurements are collected using an Anton Paar MCR 302 and CP50-1 TG measuring cone. Viscosity measurements at a shear rate of 10 Hz may be used for comparison of dispersion rheologies.

The graphenic carbon nanoparticle dispersions may be added to various base formulations, e.g., by stirring, shaking, grinding, milling and the like. As described above, the base formulations to which the graphenic carbon nanoparticle dispersions may be added may comprise various types of inks, coatings, lubricants, etc.

Illustrating the invention are the following examples, which, however, are not to be considered as limiting the invention to their details. Unless otherwise indicated, all parts and percentages in the following examples, as well as throughout the specification, are by weight.

EXAMPLES

Aqueous dispersions weight 1500 g were produced including thermally produced graphenic particles TG and/or base graphene particles BG at total solids loadings between 3 and 6 weight percent depending on the formulation, using a pigment-to-dispersant weight ratio TG and BG:Dispersant of 14:1. Graphenic carbon sources included thermally produced graphenic carbon nanoparticles TG sold under the name Raymor PureWave graphene nanoplatelets and XG Sciences M25 exfoliated graphite graphene nanoplatelets BG. The dispersant was polyvinyl pyrrolidone at a molecular weight near 1.3 MDa. The dispersions were first mixed in the appropriate amount of water with a Cowles blade between 500-1000 rpm for approximately 60 minutes before transferring to an Eiger mill with a 250 mL milling chamber volume. The milling media size using during the milling step was approximately 1.0 mm (Zirmil Y), and was added to the milling chamber to take up approximately 80% of the total volume. Dispersions were milled at 2000 rpm at a residence time of 15 minutes.

Table 1 lists particle size distributions of the aqueous dispersions after milling for a 15 minute residence time in the Eiger mill, showing solutions containing M25 typically correspond to larger particle size. In Table 1, D10 means 10 percent of the particles are less than or equal to the designated size, D50 means 50 percent of the particles are less than or equal to the designated size, and D90 means 90 percent of the particles are less than or equal to the designated size.

TABLE 1

Particle size distribution of various graphene dispersions in aqueous solution

| Graphene Dispersion Sample | Particle size distribution (μm) | | |
| --- | --- | --- | --- |
| | D10 | D50 | D90 |
| PureWave only 3 wt-% | 3.5 | 6.4 | 12.1 |
| 1:1 PureWave/M25 3 wt-% | 3.9 | 17.1 | 37.0 |
| 1:3 PureWave/M25 3 wt-% | 2.7 | 10.9 | 20.7 |
| M25 only 3 wt-% | 5.8 | 24.3 | 60.0 |
| 1:3 PureWave/M25 6 wt-% | 3.6 | 21.7 | 57.5 |

Particle size collected using a Mastersizer 2000 with a Hydro 2000S(A) accessory using the general purpose (spherical) analysis model.

FIG. 1 provides rheological profiles of 3 wt-% aqueous graphene dispersions of (•) TG Raymor PureWave graphene, (+) BG XG Sciences M25 exfoliated graphite graphene, (■) 1:1 TG:BG and (▲) 1:3 TG:BG weight-ratio of TG Raymor PureWave graphene and BG XG Sciences M25 exfoliated graphite graphene, as well as (♦) a 6 wt-% aqueous dispersion of 1:3 TG:BG TG Raymor PureWave graphene and BG XG Sciences M25 exfoliated graphite graphene. All dispersions contain a polyvinylpyrrolidone dispersant at a 14:1 graphene/dispersant weight ratio. Dispersions were made by Eiger milling at 2000 rpm with a 15 minute residence time.

Figure 2:
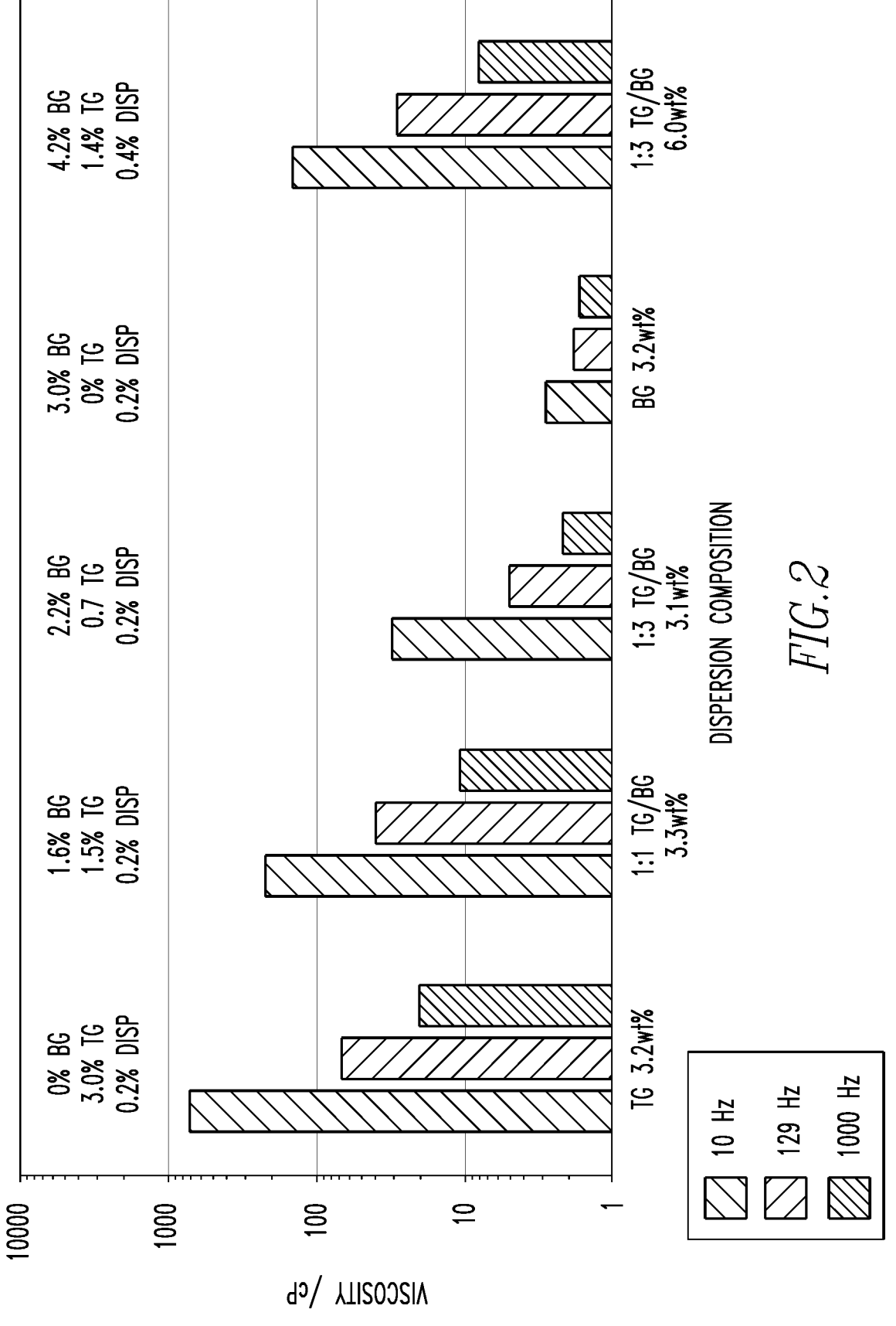
FIG. 2 is a graph showing viscosities of various aqueous graphene dispersions.

FIG. 2 provides viscosity measurements of aqueous dispersions containing various quantities of BG XG Sciences M25 exfoliated graphite graphenic carbon, TG Raymor PureWave graphenic carbon, and dispersant at either 3 wt-% or 6 wt-% total TG and BG solids. The rheological profiles shown in FIG. 1 and the viscosity measurements shown in FIG. 2 were measured by standard procedures, using an Anton Paar MCR 302 and CP50-1 TG measuring cone, as described above.

As demonstrated in FIG. 1 and FIG. 2, a 3 wt-% dispersion of BG XG Sciences M25 graphene yields extremely low viscosity. On the other hand, a similar wt-% dispersion of TG Raymor Purewave graphene yields significantly higher viscosity. A viscosity of a 1:1 blend of the two TG/BG graphene dispersions yields lower yet similar (order of magnitude) viscosity to that of a 100% TG Raymor Pure-Wave graphene dispersion, indicating that the dispersion rheology is dominated by that material, even though there is half as much by weight of the TG Raymor PureWave graphene. If no synergistic effect were occurring, the viscosity of a blended graphenic carbon dispersion would be expected to be approximately half-way between that of a dispersion containing only TG Raymor PureWave graphene and a dispersion containing only BG XG Sciences M25 graphene. This higher-than-expected viscosity of a blend of the two TG and BG graphenic carbon sources at different ratios demonstrates significant interactions between the two graphene sources that yields viscosities much higher than predicted with a graphenic material (XG Sciences M25). Further, increasing the total solids of a 1:3 blend of TG Raymor PureWave/BG XG Sciences M25 graphene from 3 wt-% to 6 wt-% returns the viscosity back toward that of a 1:1 TG Raymor PureWave/BG XG Sciences M25 graphene dispersion. In both of these cases, the total content of TG Raymor PureWave graphene was -1.4-1.5 wt %. This further supports the position that the TG graphene has a strong influence on the overall viscosity of the dispersion. Although both a 3 wt-% 1:1 blend and 6 wt-% 1:3 blend have near identical concentrations of TG Raymor PureWave graphene, both dispersions contain different quantities of other components such as dispersant (0.2 wt-% vs 0.4 wt % respectively) and BG XG Sciences M25 graphene (1.6 wt-% and 4.2 wt-% respectively).

Figure 3:
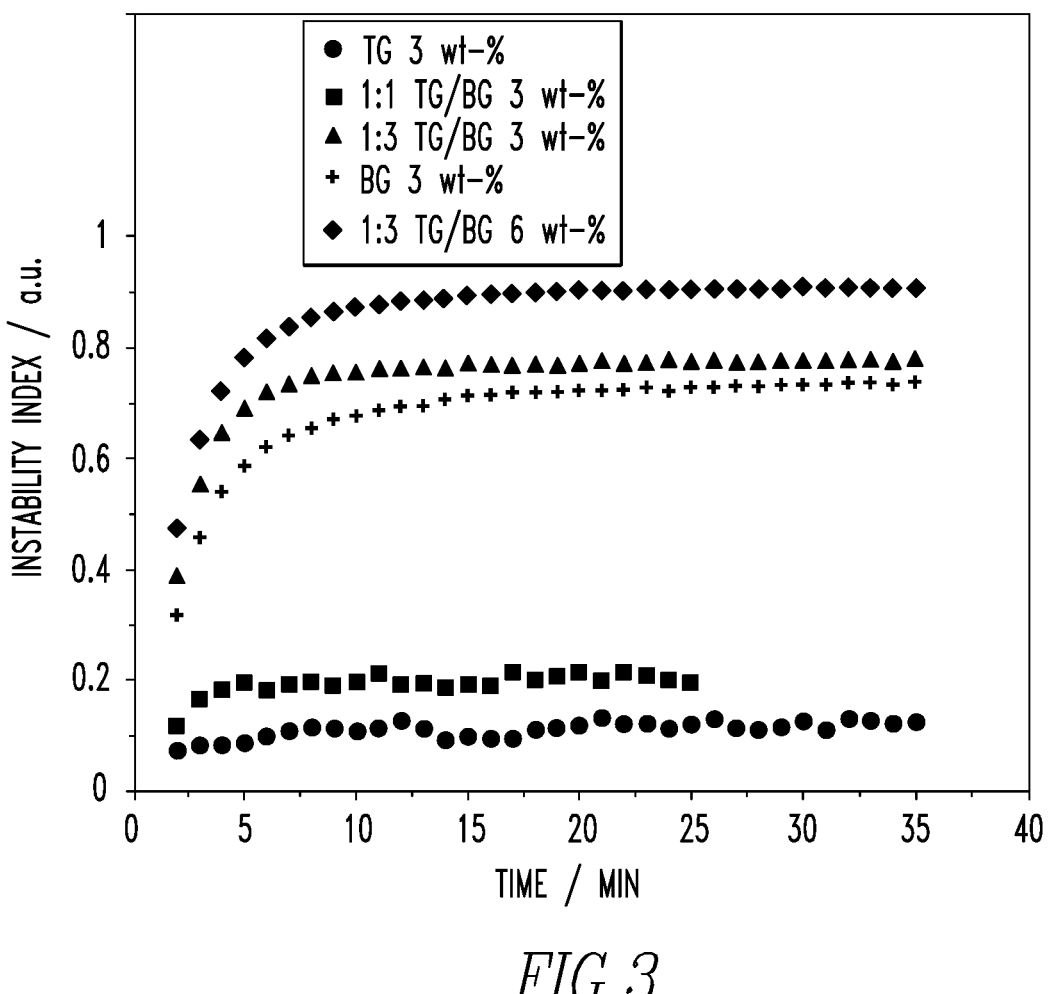
FIG. 3 is a graph of instability index vs. time for various aqueous graphene dispersions.

FIG. 3 shows instability index of 3 wt-% aqueous graphene dispersions containing (•) TG Raymor PureWave graphene, (+) BG XG Sciences M25 graphene, blends of (■) 1:1 and (▲) 1:3 weight-ratio of TG Raymor PureWave graphene and BG XG Sciences M25 graphene, as well as (♦) a 6 wt-% aqueous dispersion of 1:3 TG Raymor Pure-Wave graphene and BG XG Sciences M25 graphene. All dispersions contain a polyvinylpyrrolidone dispersant at a 14/1 graphene/dispersant ratio. Dispersions were made by Eiger milling at 2000 rpm with a 15 minute residence time. Instability index measured at 4000 rpm over time at 25° C. The instability index valves shown in FIG. 3 were measured by the centrifuge and pulsed near IR light procedure described above.

Shown in FIG. 3, a blended graphene dispersion of 1:1 TG PureWave/BG M25 has a similarly high stability over time to that of a graphene dispersion of equal weight-percent containing only TG Raymor PureWave graphene. The stability drops dramatically when the ratio of TG PureWave-to-BG M25 drops from 1:1 to 1:3, at a constant total solids loading in the dispersion of 3 weight percent indicating the stabilization effect provided by TG Raymor PureWave graphene is limited to ratios closer to 1:1. Increasing the weight-percent of total graphene in an unstable solution can still yield unstable dispersions, as evidenced from the instability index of a 1:3 TG PureWave/BG M25 graphene dispersion at 6 wt-% compared to that of 3 wt-%. It's possible that decreasing the P:B from 14 to 3 could further stabilize a 1:3 TG PureWave/BG M25 graphene dispersion. However, this example is directed to high P:B to highlight the stabilization effects TG PureWave graphene provides graphene dispersions containing other sources of BG graphene.

Figure 4:
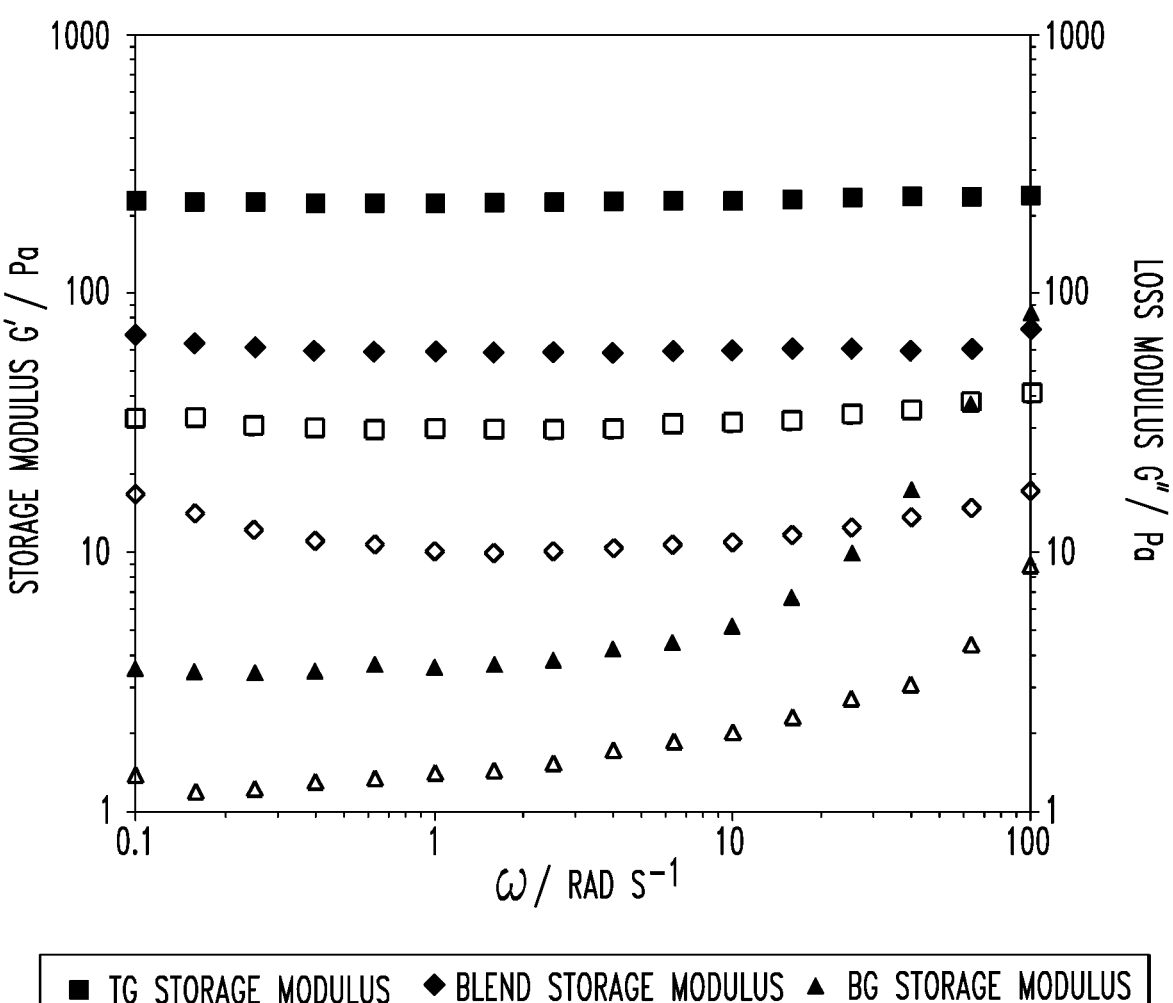
FIG. 4 is a graph of storage and loss vs. angular frequency for various aqueous graphene dispersions.

FIG. 4 is a plot of storage (closed shapes) and loss (open shapes) modulus as a function of angular frequency at a shear strain of 1% for a 3-wt % total solids loading of (■, □) TG PureWave thermally produced graphene, (▲, Δ) BG XG Sciences M25 exfoliated graphene, and (♦, ◇) a 1:1 w/w blend of TG PureWave and BG M25 graphene. Oscillatory rheology measurements were made for TG and 1:1 w/w blended graphene dispersions using a Anton Parr PP50 parallel plate spindle, while the oscillatory rheology data for the M25 graphene dispersion was made using a PP25 parallel plate spindle. A list of all terms and vocabulary can be found in ISO 6721-10, and the method for data collection followed either ASTM D7271-06 or ASTM D4440-15. Oscillatory measurements were made by measuring complex viscosity at different shear strain values between 0.1 and 100%. Plots of complex viscosity and torque felt by the spindle were plotted as a function of shear strain, after which a specific shear strain percentage was chosen at the highest torque felt in the linear region of the complex viscosity. Within that shear strain (1%), angular frequencies varied between 0.1 and 100 rad s$^{-1}$ and measurements of storage and loss modulus were collected.

The flat profile of G' vs ω in both TG PureWave and 1:1 TG PureWave/BG M25 graphene dispersions is indicate of a strong 3-D carbon network formed via the stabilizing effect of TG PureWave graphene. In contrast, BG M25 graphene dispersions display a rapid increase in slope beginning at 10 rad s$^{-1}$, which is indicative of a carbon network breakdown and rheological properties that are dominated by the solvent and polymer matrix. Under no observed angular frequency values was the carbon network for TG PureWave or 1:1 TG PureWave/BG M25 disrupted, highlighting the robust graphene dispersing ability of TG PureWave formulations. Data for TG PureWave and 1:1 TG PureWave/BG M25 graphene dispersion collected at angular frequencies between 0.1 and 100 rad/s, in conjunction with instability measurements of these dispersions and SEM images of dried powders of the dispersions described below, support the increased stability of these dispersions from a stronger particle network compared to M25 dispersions.

Figure 5:
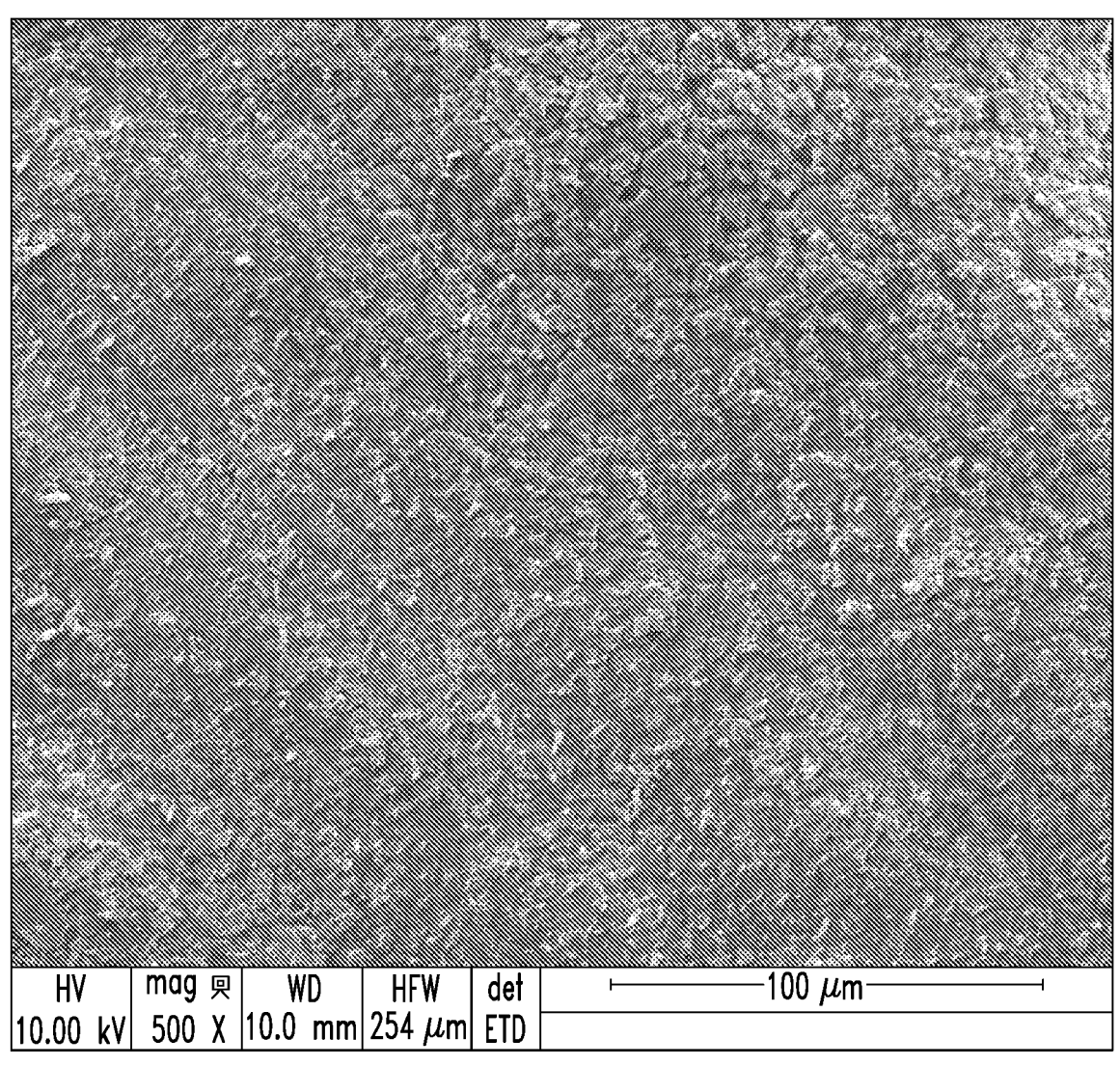
FIG. 5 is an SEM image of a dried dispersion of thermally produced graphenic carbon nanoparticles TG.

FIG. 5 is an SEM image of a dried dispersion of 3 wt-% TG PureWave, showing homogeneous, well-connected dispersion of small particles of thermally produced graphene TG.

Figure 6:
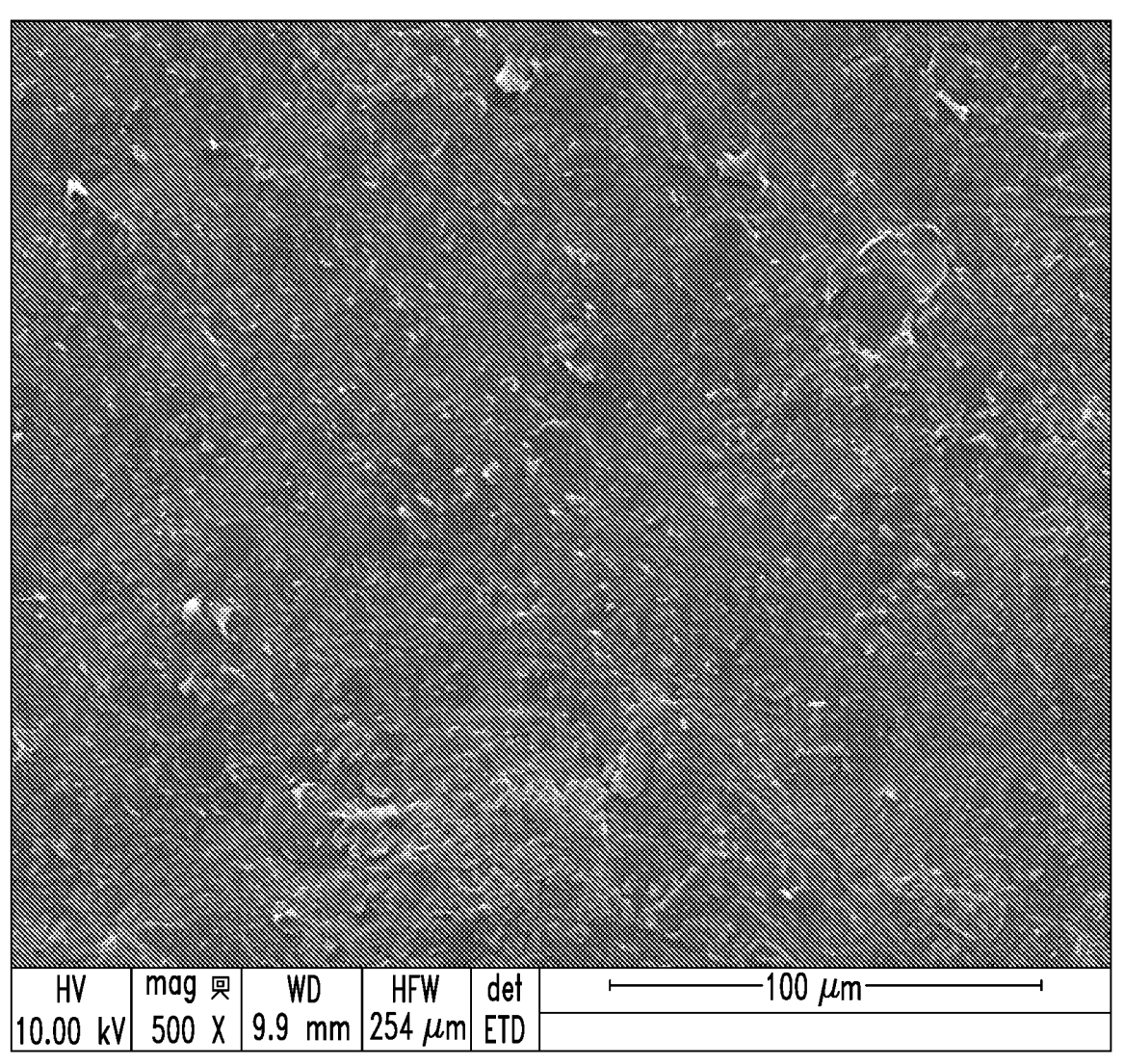
FIG. 6 is an SEM image of a dried dispersion of a blend of thermally produced graphenic carbon particles TG and base graphenic carbon particles BG.

FIG. 6 is an SEM image of a dried dispersion of 3 wt-% 1:1 TG PureWave/BG M25, showing homogeneous, well-connected dispersion of small particles of thermally produced graphene with the larger M25 exfoliated graphene particles.

Figure 7:
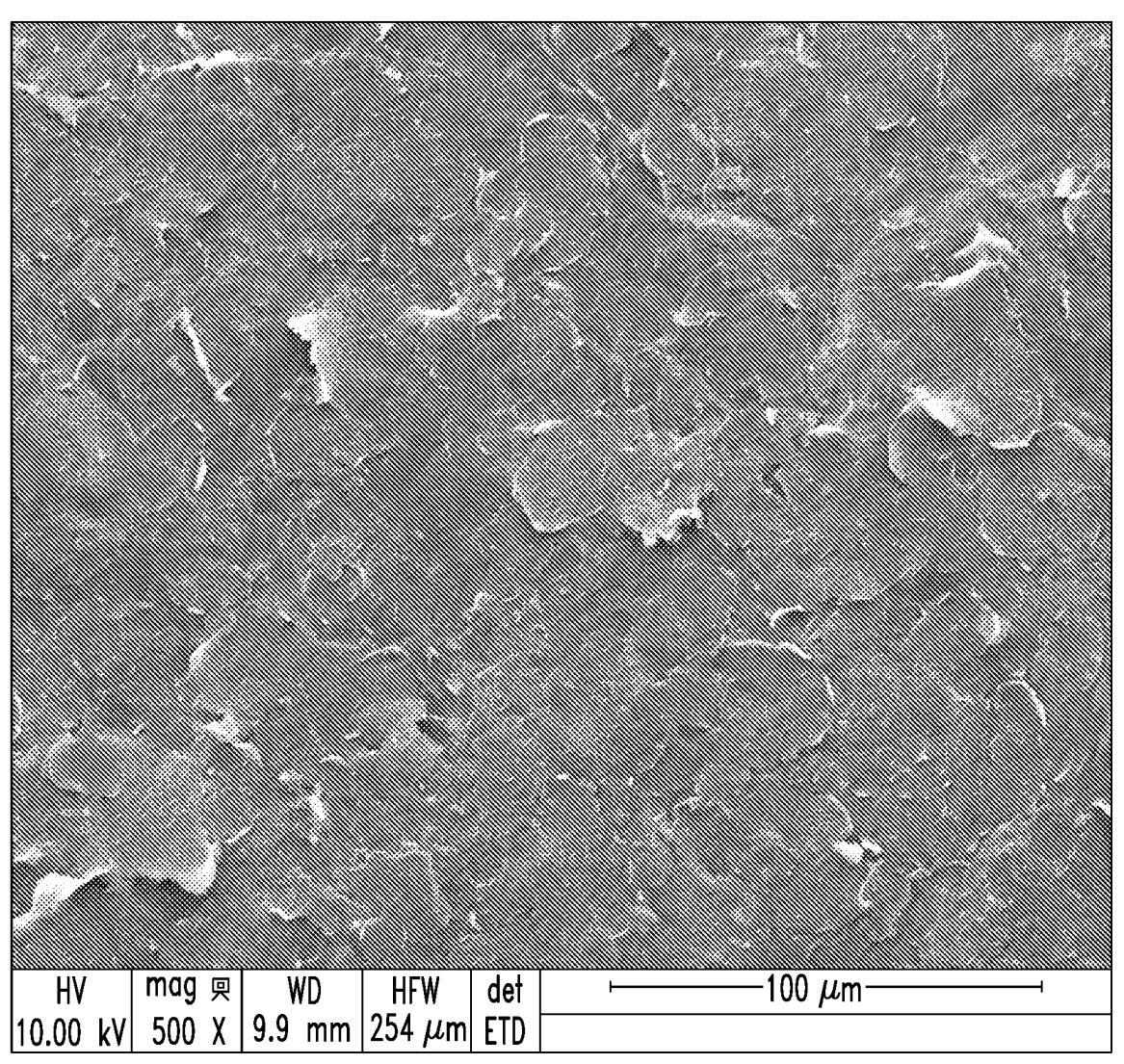
FIG. 7 is an SEM image of a dried dispersion of base graphenic carbon particles BG.

FIG. 7 is an SEM image of a dried dispersion of 3 wt-% BG XG Sciences M25 exfoliated graphene, showing poorly connected dispersion of larger graphene particles with a flaky appearance.

The SEM samples shown in FIGS. 5-7 were dispersed, then cast and allowed to dry on aluminum stubs with carbon tape. Samples were then coated with Au/Pd for 20 seconds and analyzed in the Quanta 250 FEG SEM under high vacuum. The accelerating voltage was set to 10.00 kV and the spot size was 3.0.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

For purposes of the detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

Whereas particular embodiments of this invention have been described above for purposes of illustration, it will be evident to those skilled in the art that numerous variations of the details of the present invention may be made without departing from the invention as defined in the appended claims.

What is claimed is:

1. A dispersion of graphenic carbon nanoparticles comprising:
   a solvent;
   greater than 1 weight percent graphenic carbon nanoparticles based upon a total weight of the dispersion comprising thermally produced graphenic carbon nanoparticles TG and base graphene particles BG, wherein the base graphene particles BG are different than the thermally produced graphenic nanoparticles TG; and
   a polymeric resin dispersant, wherein the weight ratio of the graphenic carbon nanoparticles TG and BG to the dispersant is greater than 5:1, and the dispersion has an instability index of less than 0.7, and
   wherein a weight ratio of the thermally produced graphenic carbon nanoparticles TG to base graphene particles BG is greater than 1.2:1.

2. The dispersion of claim 1, wherein the thermally produced graphenic carbon nanoparticles TG comprise greater than 0.5 weight percent based on the total weight of the dispersion.

3. The dispersion of claim 1, wherein the total amount of graphenic carbon nanoparticles TG and BG is at least 3 weight percent based on the total weight of the dispersion, and the instability index is less than 0.3.

4. The dispersion of claim 1, wherein a weight ratio of the total graphenic carbon nanoparticles TG and BG to the dispersant is greater than 10:1.

5. The dispersion of claim 1, wherein the thermally produced graphenic carbon particles TG have a Raman 2D:G peak ratio of at least 0.9:1, and the dispersion has an instability index less than an instability index of an identical dispersion consisting only of the base graphene particles BG in an amount equal to the total weight of the thermally produced graphenic carbon nanoparticles TG and base graphene particles BG.

6. The dispersion of claim 1, wherein the dispersion has a viscosity greater than a viscosity of an identical dispersion consisting only of the base graphene particles BG in an amount equal to the total weight of the thermally produced graphenic carbon nanoparticles TG and base graphene particles BG.

7. The dispersion of claim 1, wherein the base graphene particles BG comprise graphene oxide, reduced graphene oxide, functionalized graphene, graphetized carbon black, graphene nanoribbons, carbon nanotubes and/or fullerenes.

8. The dispersion of claim 1, wherein the thermally produced graphenic carbon nanoparticles are produced at a temperature of at least 3,500° C.

9. The dispersion of claim 1, wherein the thermally produced graphenic carbon particles are turbostratic, have a B.E.T. specific surface area of at least 70 square meters per gram, have an average aspect ratio of greater than 3:1, and a Raman D2:G peak ratio of at least 0.9 to 1.

10. The dispersion of claim 1, wherein the thermally produced graphenic carbon nanoparticles TG and BG are milled.

11. The dispersion of claim 1, wherein the dispersant comprises an addition polymer comprising the residue of a vinyl pyrrolidone.

12. The dispersion of claim 11, wherein the vinyl pyrrolidone comprises polyvinyl pyrrolidone.

13. The dispersion of claim 1, wherein the solvent comprises water.

14. The dispersion of claim 1, wherein the solvent comprises an organic solvent.

15. A method of dispersing graphenic carbon particles in a solvent comprising:
    mixing a polymeric resin dispersant into the solvent; and
    dispersing into the solvent greater than 1 weight percent graphenic carbon nanoparticles based upon a total weight of the dispersion comprising thermally produced graphenic carbon nanoparticles TG and base graphene particles BG, wherein the base graphene particles BG are different than the thermally produced graphenic nanoparticles TG, and wherein
    a weight ratio of the graphenic carbon nanoparticles TG and BG to the dispersant is greater than 5:1, and the dispersion has an instability index of less than 0.7, and wherein a weight ratio of the thermally produced graphenic carbon nanoparticles TG to base graphene particles BG is greater than 1.2:1.

16. The method of claim 15, wherein a weight ratio of the total graphenic carbon nanoparticles TG and BG to the dispersant is greater than 10:1.

17. The method of claim 15, wherein the thermally produced graphenic carbon particles TG have a Raman 2D:G peak ratio of at least 0.9:1, and the dispersion has an instability index less than an instability index of an identical dispersion consisting only of the base graphene particles BG in an amount equal to the total weight of the thermally produced graphenic carbon nanoparticles TG and base graphene particles BG.

18. The method of claim 15, wherein the dispersion has a viscosity greater than a viscosity of an identical dispersion consisting only of the base graphene particles BG in an amount equal to the total weight of the thermally produced graphenic carbon nanoparticles TG and base graphene particles BG.

19. The method of claim 15, wherein the thermally produced graphenic carbon nanoparticles TG and BG are milled.

* * * * *